United States Patent
Kim et al.

(10) Patent No.: US 11,492,678 B2
(45) Date of Patent: Nov. 8, 2022

(54) NON-ORIENTED ELECTRICAL STEEL SHEET AND METHOD FOR PREPARING SAME

(71) Applicant: POSCO, Pohang-si (KR)

(72) Inventors: Jae-Hoon Kim, Pohang-si (KR); Yong-Soo Kim, Pohang-si (KR); Jung-Woo Kim, Pohang-si (KR); Su-Yong Shin, Pohang-si (KR)

(73) Assignee: POSCO, Pohang-si (KR)

( * ) Notice: Subject to any disclaimer, the term of this patent is extended or adjusted under 35 U.S.C. 154(b) by 138 days.

(21) Appl. No.: 16/957,977

(22) PCT Filed: May 17, 2018

(86) PCT No.: PCT/KR2018/005674
§ 371 (c)(1),
(2) Date: Jun. 25, 2020

(87) PCT Pub. No.: WO2019/132132
PCT Pub. Date: Jul. 4, 2019

(65) Prior Publication Data
US 2020/0332387 A1    Oct. 22, 2020

(30) Foreign Application Priority Data
Dec. 26, 2017 (KR) .......... 10-2017-0180255

(51) Int. Cl.
*C21D 9/46* (2006.01)
*C21D 6/00* (2006.01)
(Continued)

(52) U.S. Cl.
CPC .............. *C21D 9/46* (2013.01); *C21D 6/002* (2013.01); *C21D 6/005* (2013.01); *C21D 6/008* (2013.01);
(Continued)

(58) Field of Classification Search
CPC .......... C21D 6/00; C21D 6/002; C21D 6/005; C21D 6/008; C21D 8/0205; C21D 8/12;
(Continued)

(56) References Cited

FOREIGN PATENT DOCUMENTS

| CN | 104674136 A | 6/2015 |
| CN | 107208171 A | 9/2017 |

(Continued)

OTHER PUBLICATIONS

Extended European Search Report dated Aug. 24, 2020 issued in European Patent Application No. 18893409.5.
(Continued)

*Primary Examiner* — Jenny R Wu
(74) *Attorney, Agent, or Firm* — Morgan, Lewis & Bockius LLP

(57) ABSTRACT

A non-oriented electrical steel sheet according to an exemplary embodiment of the present invention includes, by weight %, Si: 2.5 to 6.0%, Al: 0.2 to 3.5%, Mn: 0.2 to 4.5%, Cr: 0.01 to 0.2%, P: 0.005 to 0.08%, Mg: 0.0005 to 0.05%, and a remainder including Fe and inevitable impurities, while satisfying Equation 1 below, and formed with an inner oxidation layer of a 0.2 to 5 μm thickness inside a base steel sheet.

$$-2.5 \leq [P]/[Cr]-[Mg] \times 100 \leq 6.5 \quad \text{[Equation 1]}$$

(In Equation 1, [P], [Cr], and [Mg] respectively represent a content (by wt %) of P, Cr, and Mg).

9 Claims, 2 Drawing Sheets

(51) Int. Cl.
*C21D 8/02* (2006.01)
*C21D 8/12* (2006.01)
*C22C 38/00* (2006.01)
*C22C 38/04* (2006.01)
*C22C 38/06* (2006.01)
*C22C 38/34* (2006.01)

(52) U.S. Cl.
CPC ......... *C21D 8/0205* (2013.01); *C21D 8/1222* (2013.01); *C21D 8/1233* (2013.01); *C21D 8/1272* (2013.01); *C22C 38/002* (2013.01); *C22C 38/04* (2013.01); *C22C 38/06* (2013.01); *C22C 38/34* (2013.01)

(58) Field of Classification Search
CPC .. C21D 8/1222; C21D 8/1233; C21D 8/1272; C21D 9/46; C22C 38/00; C22C 38/002; C22C 38/004; C22C 38/02; C22C 38/04; C22C 38/06; C22C 38/34; C22C 38/38; H01F 1/14775; H01F 1/16; Y02P 10/20
See application file for complete search history.

(56) References Cited

FOREIGN PATENT DOCUMENTS

| | | | | |
|---|---|---|---|---|
| CN | 107208171 | A | * 9/2017 | ............... C21D 1/34 |
| EP | 2960352 | A1 | 12/2015 | |
| EP | 3037565 | A1 | 6/2016 | |
| EP | 2537958 | B1 | 8/2016 | |
| EP | 3263719 | A1 | 1/2018 | |
| JP | 2001-172752 | A | 6/2001 | |
| JP | 2001172752 | A | * 6/2001 | |
| JP | 2002-088452 | A | 3/2002 | |
| JP | 2003-013190 | A | 1/2003 | |
| JP | 3956596 | B2 | 8/2007 | |
| JP | 2011-57603 | A | 8/2011 | |
| JP | 5423440 | B2 | 2/2014 | |
| JP | 2016-199787 | A | 12/2016 | |
| JP | 2017-101315 | A | 6/2017 | |
| JP | 2017-106073 | A | 6/2017 | |
| KR | 10-1263139 | B1 | 5/2013 | |
| KR | 10-2015-0074296 | A | 7/2015 | |
| KR | 10-2016-0015376 | A | 2/2016 | |
| KR | 10-16505791 | B1 | 3/2016 | |
| KR | 10-2017-106073 | A | 6/2017 | |
| KR | 10-2017-0107042 | A | 9/2017 | |
| KR | 10-2018-0070949 | A | 6/2018 | |
| KR | 10-2018-0070950 | A | 6/2018 | |
| KR | 10-1901313 | B1 | 9/2018 | |
| KR | 10-2019-0077892 | A | 7/2019 | |
| KR | 10-2019-0078251 | A | 7/2019 | |

OTHER PUBLICATIONS

Chinese Office Action dated Apr. 6, 2021 issued in Chinese Patent Application No. 201880084861.9.
International Search Report dated Sep. 19, 2018 issued in International Patent Application No. PCT/KR2018/005674 (with English translation).

* cited by examiner

NON-ORIENTED ELECTRICAL STEEL SHEET AND METHOD FOR PREPARING SAME

CROSS-REFERENCE OF RELATED APPLICATIONS

This application is the U.S. National Phase under 35 U.S.C. § 371 of International Patent Application No. PCT/KR2018/005674, filed on May 17, 2018, which in turn claims the benefit of Korean Application No. 10-2017-0180255, filed on Dec. 26, 2017, the entire disclosures of which applications are incorporated by reference herein.

TECHNICAL FIELD

The present disclosure relates to a non-oriented electrical steel sheet and a manufacturing method thereof. In detail, the present disclosure relates to a non-oriented electrical steel sheet of which an insulation characteristic, workability, and magnetism are simultaneously excellent by adding an appropriate amount of P, Cr, and Mg elements to the steel sheet and forming an inner oxidation layer inside the steel sheet, and a manufacturing method thereof.

BACKGROUND ART

Effective use of electrical energy has become a big issue for improving the global environment such as energy saving, reduction of fine dust generation, reduction of greenhouse gas, and the like. Since more than 50% of the total electrical energy that is currently being generated is consumed in electric motors, high efficiency of the electric motors is indispensable to achieve highly efficient use of electricity.

In recent years, as the field of eco-friendly vehicles (hybrid vehicles, plug-in hybrid vehicles, electric vehicles, and fuel cell vehicles) has been rapidly developed, interest in high-efficiency drive motors has been rapidly increasing, and high-efficiency motors for home appliances and super premium motors for heavy electrical appliances have been recognized and government regulations are continuing, so demand for efficient use of electrical energy is higher than ever.

On the other hand, the electrical steel sheet used as the material of the motor is manufactured by stacking thin steel sheets in multiple layers to reduce an eddy current loss, and at this time, each steel sheet must be insulated so that a current does not flow. To this end, an insulating coating is applied to the surface of the electrical steel sheet.

Normally, the insulating coating is composed of organic and inorganic composite materials. This insulating coating maintains the insulation between the stacked upper and lower steel sheets to reduce the eddy current loss, so there is a merit that motor efficiency is further improved if the steel sheet is completely insulated by coating it thickly. However, when the thickness of the insulating coating layer increases, there is a problem in that the motor efficiency is deteriorated due to the deterioration of a stacking factor, and mold damage occurs due to the formation of foreign materials such as dust during a punching, so that the producibility is deteriorated. Therefore, it is necessary to secure insulating properties while reducing the thickness of the coating layer by minimally applying the insulating coating.

Conventionally, a technique for forming an oxidation layer inside the base steel sheet has been proposed. However, since appropriate amounts of P, Cr, and Mg were not added, there was a limitation that the desired insulating characteristic and magnetism could not be sufficiently secured.

DISCLOSURE

An exemplary embodiment of the present invention provides a non-oriented electrical steel sheet and a manufacturing method thereof.

A non-oriented electrical steel sheet of which an insulation characteristic, workability, and magnetism are simultaneously excellent by adding an appropriate amount of P, Cr, and Mg elements to the steel sheet and forming an inner oxidation layer inside the steel sheet, and a manufacturing method thereof, are provided.

A non-oriented electrical steel sheet according to an exemplary embodiment of the present invention includes, by weight %, Si: 2.5 to 6.0%, Al: 0.2 to 3.5%, Mn: 0.2 to 4.5%, Cr: 0.01 to 0.2%, P: 0.005 to 0.08%, Mg: 0.0005 to 0.05%, and a remainder including Fe and inevitable impurities, while satisfying Equation 1 below, and formed with an inner oxidation layer of a 0.2 to 5 μm thickness inside a base steel sheet.

$$-2.5 \leq [P]/[Cr]-[Mg] \times 100 \leq 6.5 \quad \text{[Equation 1]}$$

(In Equation 1, [P], [Cr], and [Mg] respectively represent a content (by wt %) of P, Cr, and Mg.)

The inner oxidation layer may be formed in a range of 5 μm or less from the surface of the base steel sheet to the inner direction of the base steel sheet.

The inner oxidation layer may include one oxide or more of $Cr_2O_3$ and MgO.

An average roughness of an interface of the inner oxidation layer and the base steel sheet may be 1 to 5 μm.

A surface oxidation layer in contact with the surface of the base steel sheet and formed in the inner direction of the base steel sheet may be further included.

The inner oxidation layer and surface oxidation layer may include 0.05 wt % or more of oxygen.

The thickness of the inner oxidation layer may be thicker than the thickness of the surface oxidation layer.

The resistivity of the non-oriented electrical steel sheet according to an exemplary embodiment of the present invention may be 45 pf-cm or more.

The non-oriented electrical steel sheet according to an exemplary embodiment of the present invention may further include at least one of C, S, N, Ti, Nb, and V at 0.004 wt % or less.

A method for manufacturing a non-oriented electrical steel sheet according to an exemplary embodiment of the present invention includes producing a slab including, by weight %, Si: 2.5 to 6.0%, Al: 0.2 to 3.5%, Mn: 0.2 to 4.5%, Cr: 0.01 to 0.2%, P: 0.005 to 0.08%, Mg: 0.0005 to 0.05%, and a remainder including Fe and inevitable impurities and satisfying Equation 1; heating the slab; heat rolling the slab to produce a heat-rolled sheet; cold rolling the heat-rolled sheet to produce a cold-rolled sheet; and finally annealing the cold-rolled sheet.

Herein, the final annealing step includes a rapid temperature rising step, a normal temperature rising step, and a soaking step to increase a temperature rising speed by 15° C./s or higher, and the rapid temperature rising step is performed at a dew point temperature of −10 to 60° C.

The rapid temperature rising step heats the cold-rolled sheet to 450 to 600° C.

The normal temperature rising step may be performed at a temperature rising speed of 1 to 15° C./s and a dew point temperature of −50 to −20° C.

The soaking temperature of the soaking step may be 850 to 1050° C.

The non-oriented electrical steel sheet according to an exemplary embodiment of the present invention adds the appropriate amount of P, Cr, and Mg elements to the steel sheet and forms the inner oxidation layer inside the steel sheet, thereby obtaining the non-oriented electrical steel sheet simultaneously having an excellent insulating characteristic, workability, and magnetism.

Therefore, the thickness of the insulating layer may be minimized, whereby a stacking factor increases, and efficiency of a motor manufactured from the non-oriented electrical steel sheet increases.

Resultantly, it is possible to manufacture environmentally-friendly automotive motors, motors for high efficiency household appliances, and super premium-class electric motors.

MODE FOR INVENTION

Figure 1:
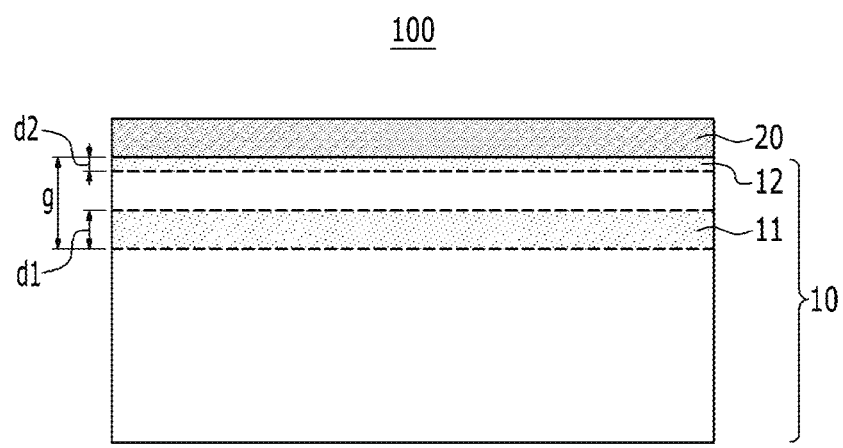
FIG. 1 is a schematic cross-sectional side view of a non-oriented electrical steel sheet according to an exemplary embodiment of the present invention.

It will be understood that, although the terms first, second, third, etc. may be used herein to describe various elements, components, regions, layers, and/or sections, they are not limited thereto. These terms are only used to distinguish one element, component, region, layer, or section from another element, component, region, layer, or section. Thus, a first component, constituent element, or section described below may be referred to as a second component, constituent element, or section, without departing from the range of the present invention.

The terminologies used herein are used just to illustrate a specific exemplary embodiment, but are not intended to limit the present invention. It must be noted that, as used in the specification and the appended claims, singular forms used herein include plural forms unless the context clearly dictates the contrary. It will be further understood that the term "comprises" or "includes", used in this specification, specifies stated properties, regions, integers, steps, operations, elements, and/or components, but does not preclude the presence or addition of other properties, regions, integers, steps, operations, elements, components, and/or groups.

When referring to a part as being "on" or "above" another part, it may be positioned directly on or above the other part, or another part may be interposed therebetween. In contrast, when referring to a part being "directly above" another part, no other part is interposed therebetween.

Unless defined otherwise, all terms including technical and scientific terms used herein have the same meanings as those commonly understood by one of ordinary skill in the art to which the present invention belongs. Such terms as those defined in a generally used dictionary are to be interpreted to have the same meanings as contextual meanings in the relevant field of art, and are not to be interpreted to have idealized or excessively formal meanings unless clearly defined in the present application.

Unless otherwise stated, % means wt %, and 1 ppm is 0.0001 wt %.

In an exemplary embodiment of the present invention, a further inclusion of an additional element means that an additional amount of the additional element is included in place of iron (Fe), which is a balance.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In an exemplary embodiment of the present invention, a range of a composition of a non-oriented electrical steel sheet, particularly the range of P, Cr, and Mg, which are main additive components, is optimized and an inner oxidation layer is formed inside the steel sheet to simultaneously improve the insulation characteristic, the workability, and the magnetism.

The non-oriented electrical steel sheet according to an exemplary embodiment of the present invention includes, by weight %, Si: 2.5 to 6.0%, Al: 0.2 to 3.5%, Mn: 0.2 to 4.5%, Cr: 0.01 to 0.2%, P: 0.005 to 0.08%, Mg: 0.0005 to 0.05%, and the remainder including Fe and inevitable impurities.

First, the reason for limiting the components of the non-oriented electrical steel sheet will be described.

Si: 2.5 to 6.0 wt %

Silicon (Si) increases the resistivity of the material to lower the iron loss. If to little Si is added, the effect of improving the high frequency iron loss may be insufficient. On the contrary, when too much Si is added, the hardness of the material may increase and the cold rolling property may be extremely deteriorated. Thus, the productivity and punching property may become poor. Therefore, Si may be added in the above-mentioned range. More specifically, Si at 2.6 to 4.5 wt % may be included.

Al: 0.2 to 3.5 wt %

Aluminum (Al) plays a role of lowering the iron loss by increasing the resistivity of the material. If too little Al is added, it may not be effective in the reduction of high frequency iron loss, and a nitride is formed finely, which may deteriorate the magnetism. On the other hand, if too much Al is added, various problems may occur in all processes such as steelmaking and continuous casting, and thus the productivity may be greatly lowered. Therefore, Al may be added in the above-mentioned range. More specifically, Al at 0.4 to 3.3 wt % may be further included.

Mn: 0.2 to 4.5 wt %

Manganese (Mn) enhances the resistivity of the material to improve the iron loss and form a sulfide. When too little is added, MnS may precipitate finely to deteriorate the magnetism. If too much is added, the magnetic flux density may be reduced by promoting the formation of [111] texture, which may be disadvantageous to the magnetism. Therefore, Mn may be added in the above-mentioned range. More specifically, Mn at 0.3 to 3.5 wt % may be included.

Resistivity: 45 μΩ·cm or more

The resistivity is a value calculated from 13.25+11.3×([Si]+[A]+[Mn]/2). In this case, [Si], [Al], and [Mn] represent the content (by wt %) of Si, Al, and Mn. The higher the resistivity, the lower the iron loss. If the resistivity is too low, the iron loss is poor and it is difficult to use it as a high efficiency motor. More specifically, the resistivity may be 50 to 80 pf-cm.

Cr: 0.01 to 0.2 wt %

Chromium (Cr) is a corrosion-resistant element that concentrates on the surface layer to improve the corrosion resistance and suppress oxidation layer production. If too little Cr is included, the oxidation proceeds rapidly, thereby making it difficult to control the formation of the inner oxidation layer. If too much Cr is included, on the contrary, the oxidation is suppressed, thereby making it difficult to form the inner oxidation layer. More specifically Cr at 0.015 to 0.15 wt % may be included.

P: 0.005 to 0.08 wt %

Phosphorus (P) is concentrated on the surface and serves to control a fraction of the inner oxidation layer. If the addition amount of P is too small, it may be difficult to form the uniform inner oxidation layer. If the addition amount of P is too large, a melting point of a Si-based oxide may fluctuate, and the inner oxidation layer may be rapidly formed. Therefore, the content of P may be controlled in the above-described range. More specifically P at 0.005 to 0.07 wt % may be included.

Mg: 0.0005 to 0.05 wt %

Magnesium (Mg) serves to promote a surface concentration of Cr and P in an oxidizing atmosphere. When too little Mg is included, the above-described role may not be properly performed. If too much Mg is included, the excessive surface concentration of Cr and P causes thickening of the inner oxidation layer, thereby causing deterioration of the magnetism. Therefore, it is possible to control the content of Mg in the above-described range. More specifically Mg at 0.001 to 0.03 wt % may be included.

The non-oriented electrical steel sheet according to an exemplary embodiment of the present invention satisfies Equation 1 below.

$$-2.5 \leq [P]/[Cr]-[Mg] \times 100 \leq 6.5 \qquad \text{[Equation 1]}$$

(In Equation 1, [P], [Cr], and [Mg] respectively represent the content (by wt %) of P, Cr, and Mg.)

When a value of [P]/[Cr]−[Mg]×100 is less than −2.5, the formation of the inner oxidation layer hardly occurs, while on the other hand, when it exceeds 6.5, the inner oxidation layer is excessively formed and needs to be controlled within an appropriate range. More specifically, the value of [P]/[Cr]−[Mg]×100 may be −1.5 to 1.0.

Other Impurities

Unavoidable impurities such as carbon (C), sulfur (S), nitrogen (N), titanium (Ti), niobium (Nb), vanadium (V), and the like may be included in addition to the above-mentioned elements.

N is combined with Ti, Nb, and V to form a nitride and serves to deteriorate grain growth.

C reacts with N, Ti, Nb, V, etc. to form fine carbides, which interfere with grain growth and magnetic domain migration.

S forms sulfides to degrade the grain growth.

When the impurity element is further included as described above, one or more of C, S, N, Ti, Nb, and V may be included in the amount of 0.004 wt % or less, respectively.

The non-oriented electrical steel sheet according to an exemplary embodiment of the present invention forms the inner oxidation layer therein, so that an insulating characteristic, workability, and magnetism may simultaneously obtain an excellent effect. The structure of the non-oriented electrical steel sheet according to an exemplary embodiment of the present invention is now described with reference to FIG. 1. The non-oriented electrical steel sheet of FIG. 1 is only for exemplarily describing the present invention, and the present invention is not limited thereto. Therefore, the structure of the non-oriented electrical steel sheet may be variously modified.

As shown in FIG. 1, in the non-oriented electrical steel sheet 100 according to an exemplary embodiment of the present invention, an inner oxidation layer 11 is formed inside a base steel sheet 10. By forming the inner oxidation layer 11 as above-described, even if an insulating layer 20 is formed thin, it is possible to secure the appropriate insulating characteristics.

The inner oxidation layer 11 is formed inside the base steel sheet 10, and is different from the insulating layer 20 formed outside the base steel sheet 10. More specifically, the inner oxidation layer 11 may be formed in a range of 5 μm or less from the surface of the base steel sheet 10 in the inner direction of the base steel sheet 10. The range of 5 μm or less in the inner direction of the base steel sheet 10 is indicated by g of FIG. 1. That is, the distance from the surface of the base steel sheet 10 to the innermost surface of the inner oxidation layer 11 may be 5 μm or less. If the inner oxidation layer 11 is heavy formed inside the base steel sheet 10, that is, if g of FIG. 1 is too large, the desired insulation characteristic cannot be obtained, but rather a problem may arise in that the magnetism characteristic is deteriorated. The minimum value of g of FIG. 1 becomes the thickness of the inner oxidation layer 11, and when g of FIG. 1 is the same as the thickness d1 of the inner oxidation layer 11, it means that the inner oxidation layer 11 is formed in contact with the steel sheet surface.

The thickness d1 of the inner oxidation layer 11 may be 0.2 to 5 μm. If the thickness d1 of the inner oxidation layer 11 is too thin, the desired insulating characteristic cannot be adequately secured. If the thickness d1 of the inner oxidation layer 11 is too thick, a problem may occur in that the magnetism of the steel sheet deteriorates. More specifically, the thickness of the inner oxidation layer 11 may be 1 to 3 μm.

The inner oxidation layer 11 has the same alloy component as the base steel sheet 10, and it is distinguished from the base steel sheet 10 containing a trace amount of oxygen in that it contains more than 0.05 wt % of oxygen. As described above, since the base steel sheet 10 includes Cr, Mg, and oxygen, Cr and Mg in the inner oxidation layer 11 are reacted, thereby forming one or more oxides of $Cr_2O_3$ and MgO. More specifically, the inner oxidation layer 11 may include oxygen at 0.1 wt % or more.

Figure 2:
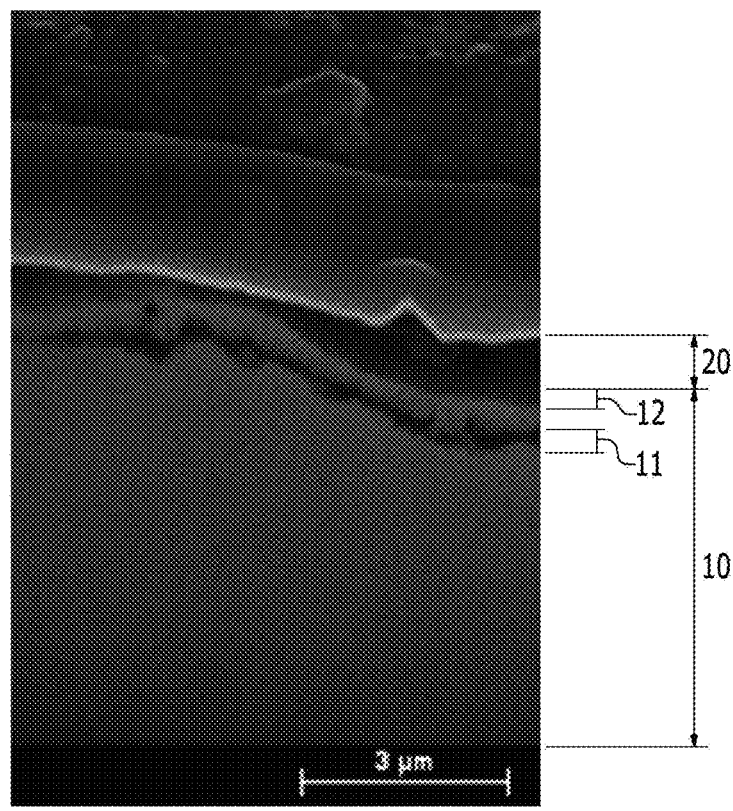
FIG. 2 is a photograph of a cross-section of a non-oriented electrical steel sheet manufactured as steel type 3 taken by a scanning electron microscope (SEM).

In FIG. 1, the interface of the inner oxidation layer 11 and the base steel sheet 10 is shown to be flat, but substantially it is formed very roughly as shown in FIG. 2. This is because oxygen rapidly flows into the base steel sheet 10 during the manufacturing process, and the base iron is produced while being oxidized, and it is advantageous for the insulation to be formed roughly. More specifically, the average roughness of the interface of the inner oxidation layer 11 and the base steel sheet 10 may be 1 to 5 μm. At this time, the interface means both the upper and lower surfaces of the inner oxidation layer 11.

Since the roughness exists on the surface of the inner oxidation layer 11, the thickness d1 of the inner oxidation layer 11 in an exemplary embodiment of the present invention may vary depending on the measurement position, and the thickness d1 of the inner oxidation layer 11 means the average thickness for the entire steel sheet.

As shown in FIG. 1, the non-oriented electrical steel sheet 100 according to an exemplary embodiment of the present invention may further include a surface oxidation layer 12 in contact with the surface of the base steel sheet 10 and formed in the inner direction of the base steel sheet 10. The surface oxidation layer 12 has the same alloy components as the base steel sheet 10, but is different from the base steel sheet 10 in that it contains 0.05 wt % or more of oxygen. In addition, the surface oxidation layer 12 is distinguished from the inner oxidation layer 11 in that it is formed on the surface side of the base steel sheet 10 rather than on the inner oxidation layer 11.

The surface oxidation layer 12 may be formed very thin in contact with the surface of the base steel sheet 10, and the thickness d1 of the inner oxidation layer 11 may be thicker than the thickness d2 of the surface oxidation layer 12. When the thickness d1 of the inner oxidation layer 11 is formed thick, the proper insulation characteristic and magnetism may be secured. More specifically, the inner oxidation layer 11 may be two or more times thicker than the thickness d2 of the surface oxidation layer 12.

As shown in FIG. 1, a gap may be formed between the inner oxidation layer 11 and the surface oxidation layer 12. More specifically, the gap (g-d1-d2) may be 0.5 to 3 µm. When the appropriate gap is formed between the inner oxidation layer 11 and the surface oxidation layer 12, the insulation characteristic and magnetism may be further secured. When the gap is formed, as shown in FIG. 1, the layers are formed in order of the base steel sheet 10, the inner oxidation layer 11, the base steel sheet 10, and the surface oxidation layer 12. This gap is formed because Cr, P, and Mg, which have high oxidation properties, are concentrated in the specific part near the surface.

As shown in FIG. 1, an insulating layer 20 may be further formed on the base steel sheet 10. The insulating layer 20 is formed on the surface of the base steel sheet 10, that is, on the outside of the base steel sheet 10, and is distinguished from the inner oxidation layer 11 and the surface oxidation layer 12 described above. In the exemplary embodiment of the present invention, since the inner oxidation layer 11 is properly formed, it is possible to secure the sufficient insulation even if the thickness of the insulating layer 20 is thin. By forming the thickness of the insulating layer 20 thin, the stacking factor increases, and mold damage is reduced during the punching. Specifically, the thickness of the insulating layer 20 may be 0.7 to 1.0 µm. Since the insulating layer 20 is widely known in a technique field of the non-oriented electrical steel sheet, detailed description is omitted.

As described above, the non-oriented electrical steel sheet according to an exemplary embodiment of the present invention may simultaneously secure the insulation characteristic and magnetism. The insulating characteristic may be 5.0 $\Omega cm^2$ or more based on the thickness of 1 µm of the insulating layer 20. Specifically, it may be 6.0 $\Omega cm^2$ or more. In addition, the magnetic flux density B50 induced in the magnetic field of 5000 A/m may be 1.64 T or more. Based on a 0.25 mm thickness, the iron loss W10/400 may be 15.0 W/kg or less when the magnetic flux density of 1.0 T is induced at the frequency of 400 Hz.

A manufacturing method of the non-oriented electrical steel sheet according to an exemplary embodiment of the present invention includes producing a slab including, by a weight %, Si: 2.5 to 6.0%, Al: 0.2 to 3.5%, Mn: 0.2 to 4.5%, Cr: 0.01 to 0.2%, P: 0.005 to 0.08%, Mg: 0.0005 to 0.05%, and the remainder including Fe and inevitable impurities and satisfying Equation 1 below; heating the slab; heat rolling the slab to produce a heat-rolled sheet; cold rolling the heat-rolled sheet to produce a cold-rolled sheet; and finally annealing the cold-rolled sheet.

Hereinafter, each step is described in detail.

First, the slab is produced. Since the reason why the addition ratio of each composition in the slab is limited is the same as the reason for limiting the composition of the non-oriented electrical steel sheet which is mentioned above, the repeated description is omitted. The composition of the slab is substantially the same as that of the non-oriented electrical steel sheet since it does not substantially change during the manufacturing process such as hot rolling, annealing the hot rolled sheet, cold rolling, and final annealing and the like which will be described later.

Next, the slab is heated. In detail, the slab is inserted into a heating furnace and heated at 1100 to 1250° C. If heated at a temperature which is exceeding 1250° C., the precipitate is dissolved again and may be precipitated finely after hot rolling.

The heated slab is hot rolled to 2 to 2.3 mm to manufacture a hot rolled sheet. In the step of manufacturing the hot rolled sheet, the finishing temperature may be 800 to 1000° C.

After the step of manufacturing the hot rolled sheet, the step of annealing the hot rolled sheet may be further included. In this case, the hot-rolled sheet annealing temperature is adjusted to 1050 to 1150° C. When the hot-rolled sheet annealing temperature is less than 1050° C., the texture does not grow or minutely grows so that the increasing effect of the magnetic flux density is less, while when the annealing temperature exceeds 1150° C., the magnetic characteristic is rather deteriorated, and the rolling workability may deteriorate due to the deformation of the plate shape. More specifically, the temperature range may be 950 to 1125° C. More specifically, the annealing temperature of the hot rolled sheet is 900 to 1100° C. The hot-rolled sheet annealing is performed to increase the orientation favorable to the magnetic property as necessary and may be omitted.

Next, the hot rolled sheet is pickled and cold rolled to have a predetermined sheet thickness. It may be applied depending on the thickness of the hot rolled sheet, however it may be cold rolled to a final thickness of 0.2 to 0.65 mm by applying a percentage reduction in thickness of 70 to 95%.

The cold rolled sheet which is final cold rolled is subjected to final annealing. At this time, in order to form the appropriate inner oxidation layer, the final annealing step includes a rapid temperature rising step, a normal temperature rising step, and a soaking step.

The rapid temperature rising step is a step of heating the cold-rolled sheet at a high temperature rising speed of 15° C./s or higher. If the temperature rising speed is insufficient, the inner oxidation layer cannot be properly formed.

The rapid temperature rising step is carried out at a dew point temperature of −10 to 60° C. The inner oxidation layer may be appropriately formed through such an oxidizing atmosphere. If the dew point temperature is too low, it is difficult for the inner oxidation layer to be formed. Conversely, if the dew point temperature is too high, the inner oxidation layer is formed too thick, the magnetism is inferior, and dusting occurs during the punching, so that the producibility may be inferior.

The rapid temperature rising step refers to a step of heating the cold-rolled sheet to 450 to 600° C.

Next, the normal temperature rising step is a step of heating the cold-rolled sheet subjected to the rapid temperature rising step to a soaking temperature. Specifically, a starting temperature of the normal temperature rising step is 450 to 600° C., and an ending temperature is 850 to 1050° C. Since the inner oxidation layer was properly formed in the rapid temperature rising step described above, there is no need to increase the temperature rising speed in the normal temperature rising step or to control the atmosphere with the oxidizing atmosphere. Specifically, the normal temperature rising step has the temperature rising speed of 1 to 15° C./s, and may be performed at the dew point temperature of −50 to −20° C.

Next, the soaking step may be annealed for 30 seconds to 3 minutes at a soaking temperature of 850 to 1050° C. If the soaking temperature is too high, the rapid growth of the crystal grain may occur, resulting in deteriorated magnetic flux density and high-frequency iron loss. More specifically, the final annealing may be performed at the soaking temperature of 900 to 1000° C. In the final annealing process, all the processed texture (i.e., 99% or more) formed in the cold rolling step, which is the previous step, may be recrystallized.

Thereafter, a step of forming an insulating layer may be further included. The insulating layer may be formed using a normal method except that the thickness is thin. The method of forming the insulating layer is widely known in the field of the non-oriented electrical steel sheet, so the detailed description is omitted.

The following example illustrates the present invention in more detail. However, the following example is only an exemplary embodiment of the present invention, and the present invention is not limited to the following example.

EXAMPLE

The slab composed of the following Table 1 was prepared. All of the elements other than those shown in Table 1 such as C, S, N, Ti, and the like were controlled to 0.003 wt %. The slab was heated at 1150° C., and finishing hot rolled at 850° C. to produce the hot rolled sheet having a thickness of 2.0 mm. The hot rolled sheet which has been hot rolled was annealed at 1100° C. for 4 minutes and then pickled. Thereafter, it was cold rolled to a thickness of 0.25 mm, and the final annealing was performed. The temperature rising speed and dew point condition of the rapid temperature rising step up to 500° C. are summarized in the following Table 2. Thereafter, the temperature was raised to 1000° C. and maintained at 1000° C. for 45 seconds. Thereafter, the insulating layer having the thickness of 1 μm was formed.

The insulation characteristic was measured by a Franklin tester, and the magnetism was determined by the average value of the rolling direction and vertical direction using a single sheet tester and summarized in the following Table 2.

TABLE 1

| Steel type | Si (wt %) | Al (wt %) | Mn (wt %) | Resistivity (μΩ·cm) | Cr (wt %) | P (wt %) DELETED-TEXTS | Mg (wt %) | Equation 1 value |
|---|---|---|---|---|---|---|---|---|
| 1 | 2.8 | 0.5 | 0.5 | 53 | 0.02 | 0.01 | 0.001 | 0.4 |
| 2 | 2.8 | 0.5 | 0.5 | 53 | 0.01 | 0.075 | 0.001 | 7.4 |
| 3 | 2.8 | 0.5 | 0.5 | 53 | 0.02 | 0.006 | 0.003 | 0 |
| 4 | 3.1 | 0.7 | 1.5 | 65 | 0.05 | 0.03 | 0.02 | −1.4 |
| 5 | 3.1 | 0.7 | 1.5 | 65 | 0.05 | 0.03 | 0.02 | −1.4 |
| 6 | 3.1 | 0.7 | 1.5 | 65 | 0.05 | 0.01 | 0.02 | −1.8 |
| 7 | 2.7 | 1.5 | 2.5 | 75 | 0.05 | 0.01 | 0.06 | −5.8 |
| 8 | 2.7 | 1.5 | 2.5 | 75 | 0.05 | 0.07 | 0.005 | 0.9 |
| 9 | 2.7 | 1.5 | 2.5 | 75 | 0.15 | 0.07 | 0.005 | −0.03 |
| 10 | 2.8 | 0.8 | 1.8 | 64 | 0.15 | 0.01 | 0.002 | −0.13 |
| 11 | 2.8 | 0.8 | 1.8 | 64 | 0.15 | 0.07 | 0.03 | −2.53 |
| 12 | 2.8 | 0.8 | 1.8 | 64 | 0.25 | 0.01 | 0.025 | −2.46 |
| 13 | 3.2 | 0.5 | 0.5 | 58 | 0.0003 | 0.0003 | 0.0003 | 0.97 |

TABLE 2

| Steel type | Temperature rising speed (° C./s) | Dew point (° C.) | inner oxidation layer thickness (μm) | Insulation resistance Ωcm² | W10/400 (W/kg) | B50 (T) | |
|---|---|---|---|---|---|---|---|
| 1 | 15 | −5 | 1.5 | 7.8 | 14.8 | 1.67 | Example |
| 2 | 13 | 10 | 3.5 | 12.1 | 17.5 | 1.62 | Comparative Example |
| 3 | 12 | 20 | 1.2 | 6.5 | 14.5 | 1.66 | Example |
| 4 | 18 | −20 | 0.1 | 3.5 | 15.7 | 1.63 | Comparative Example |
| 5 | 18 | 35 | 1.7 | 8.5 | 13.5 | 1.64 | Example |
| 6 | 8 | 5 | 0.15 | 4.5 | 15.1 | 1.63 | Comparative Example |
| 7 | 15 | 45 | 4.5 | 15.2 | 17.9 | 1.61 | Comparative Example |
| 8 | 18 | 50 | 1.5 | 6.5 | 14.2 | 1.64 | Example |
| 9 | 26 | 70 | 5.2 | 18.5 | 18.9 | 1.61 | Comparative Example |
| 10 | 28 | 30 | 2.5 | 10.5 | 14.7 | 1.64 | Example |
| 11 | 25 | 20 | 0.2 | 2.5 | 14.5 | 1.61 | Comparative Example |
| 12 | 27 | 10 | 0.7 | 3.8 | 15.1 | 1.62 | Comparative Example |
| 13 | 15 | 20 | 0.07 | 1.5 | 15.4 | 1.62 | Comparative Example |

As shown in Table 1 and Table 2, in the example steel kinds that satisfy the temperature rising speed and dew point conditions at the time of the rapid temperature rising, it may be confirmed that the appropriate inner oxidation layer is formed, and the insulation characteristic and magnetism are all excellent.

On the other hand, in the steel types 2, 7, 11, 12, and 13 that do not contain the appropriate amounts of P, Cr, and Mg, it may be confirmed that the magnetism characteristic is poor. Particularly, in the steel types 11 and 13, even if the heating temperature and the dew point condition during the rapid temperature rising step were satisfied, it may be confirmed that the inner oxidation layer was not properly formed and the insulation characteristic was poor. Particularly, since the steel type 13 does not contain P and Mg, it may be confirmed that the inner oxidation layer is not properly formed even though Cr is contained in a small amount.

On the other hand, in the steel types 4, 6, and 9, the appropriate amounts of P, Cr, and Mg are included, but the temperature rising speed and dew point condition are not satisfied during the rapid temperature rising, so that the appropriate inner oxidation layer was not formed. The steel types 4 and 6 with the inner oxidation layer formed too thin had a particularly poor insulation resistance characteristic, and the steel type 9 with the inner oxidation layer formed too thick had a very poor magnetism characteristic.

FIG. 2 shows a photograph of a cross-section of the non-oriented electrical steel sheet manufactured by the steel type 3 with a scanning electron microscope (SEM). As shown in FIG. 2, it can be confirmed that the inner oxidation layer is properly formed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the embodiments described above are only examples and should not be construed as being limitative in any respects.

DESCRIPTION OF SYMBOLS

100: non-oriented electrical steel sheet,
10: base steel sheet,
11: inner oxidation layer,
12: surface oxidation layer,
20: insulating layer

The invention claimed is:

1. A non-oriented electrical steel sheet comprising, by a weight %, Si: 2.5 to 6.0%, Al: 0.2 to 3.5%, Mn: 0.2 to 4.5%, Cr: 0.01 to 0.2%, P: 0.005 to 0.08%, Mg: 0.0005 to 0.05%, and a remainder including Fe and inevitable impurities, satisfying Equation 1 below and formed with an inner oxidation layer of a 1 to 3 μm thickness inside a base steel sheet:

$$-2.5 \leq [P]/[Cr]-[Mg] \times 100 \leq 6.5 \quad \text{[Equation 1]}$$

in Equation 1, [P], [Cr, and [Mg] respectively represent a content (by wt %) of P, Cr, and Mg.

2. The non-oriented electrical steel sheet of claim 1, wherein
the inner oxidation layer is formed in a range of 1.2-2.5 μm.

3. The non-oriented electrical steel sheet of claim 1, wherein
the inner oxidation layer includes one oxide or more of $Cr_2O_3$ and MgO.

4. The non-oriented electrical steel sheet of claim 1, wherein
an average roughness of an interface of the inner oxidation layer and the base steel sheet is 1 to 5 μm.

5. The non-oriented electrical steel sheet of claim 1, further comprising
a surface oxidation layer in contact with the surface of the base steel sheet and formed in the inner direction of the base steel sheet.

6. The non-oriented electrical steel sheet of claim 5, wherein
the inner oxidation layer and surface oxidation layer include 0.05 wt % or more of oxygen.

7. The non-oriented electrical steel sheet of claim 5, wherein
the thickness of the inner oxidation layer is thicker than the thickness of the surface oxidation layer.

8. The non-oriented electrical steel sheet of claim 1, wherein
the resistivity of the non-oriented electrical steel sheet is 45 μΩ·cm or more.

9. The non-oriented electrical steel sheet of claim 1, wherein
the non-oriented electrical steel sheet further comprises at least one of C, S, N, Ti, Nb, and V at 0.004 wt % or less.

* * * * *